United States Patent [19]

Ingle

[11] Patent Number: 4,768,203
[45] Date of Patent: Aug. 30, 1988

[54] SIGNAL-TO-NOISE RATIO TESTING IN ADAPTIVE DIFFERENTIAL PULSE CODE MODULATION

[75] Inventor: James F. Ingle, Boro of Fair Haven, N.J.

[73] Assignee: Bell Communications Research, Inc., Livingston, N.J.

[21] Appl. No.: 98,296

[22] Filed: Sep. 18, 1987

[51] Int. Cl.4 .............................................. H04B 3/46
[52] U.S. Cl. ....................................... 375/10; 370/13; 328/162; 379/6
[58] Field of Search .......................... 375/10; 455/226; 328/162; 324/57 N; 370/13, 17; 364/574; 379/6, 23, 24, 28

[56] References Cited

U.S. PATENT DOCUMENTS

| | | | |
|---|---|---|---|
| 3,639,703 | 2/1972 | Bergemann et al. | 324/57 N |
| 3,737,781 | 6/1973 | Deerkoski | 324/57 N |
| 4,028,622 | 6/1977 | Evans et al. | 328/162 |
| 4,032,716 | 6/1977 | Allen | 324/57 N |
| 4,246,655 | 1/1981 | Parker | 455/226 |
| 4,273,970 | 6/1981 | Favin et al. | 324/52 N |
| 4,301,536 | 11/1981 | Favin et al. | 371/22 |
| 4,355,407 | 10/1982 | Mueller | 375/91 |
| 4,417,337 | 11/1983 | Favin et al. | 371/22 |
| 4,513,426 | 4/1985 | Jayant | 375/26 |

Primary Examiner—Benedict V. Safourek
Assistant Examiner—Stephen Chin
Attorney, Agent, or Firm—James W. Falk; Lionel N. White

[57] ABSTRACT

The adaptive and predictive capabilities of Adaptive Differential Pulse Code Modulation (ADPCM) equipment enable a telecommunication system to maintain acceptable signal/noise levels in voice transmission while utilizing a significantly lower encoding bit rate than that of conventional Pulse Code Modulation (PCM). ADPCM, however, has a deleterious effect on high-speed voiceband data transmission, yet due to its adaptive capabilities cannot readily be identified or evaluated by means of conventional ANSI/IEEE standard test signals and methods. The procedure of the present invention enables such identification and evaluation by imposing upon an ADPCM system a multiple-tone test signal which spans the voiceband and has amplitude characteristics similar to white noise. This signal thereby effectively overloads the adaptive and predictive capabilities of the system and causes the generation of a notably high level of quantizing noise. The resulting multitone signal-with-noise output from the system is processed in a spectrum analyzer where the accumulation of the signal levels in the distinct and narrow input tone bands is compared with the remainder of the accumulated signal power to obtain an accurate signal/noise measurement which, in addition to providing substantive analytical data, yields an indication of the presence of ADPCM, as distinguished even from tandem PCM, encoding equipment in the system.

11 Claims, 5 Drawing Sheets

SIGNAL-TO-NOISE RATIO TESTING IN ADAPTIVE DIFFERENTIAL PULSE CODE MODULATION

BACKGROUND OF THE INVENTION

Over two-thirds of the telecommunications facilities now in use for toll traffic digitally encode voice and voiceband data by sampling the customer signals at an 8000 Hz rate and encoding each sample into eight digital bits. This process of Pulse Code Modulation (PCM) provides an allocation of 64 kilobits per channel over 24 channels. Added framing information utilizes another 8 kilobits, thus resulting in the common transmission rate of 1.544 megabits per second. Various proposals have been made for increasing the available transmission channels; for example, by decreasing the number of encoding bits for each signal sample and thus substantially lessening the required transmission bandwidth.

The only one of these proposals that has reached significant implementation is the 32 kilobit Adaptive Differential Pulse Code Modulation (ADPCM) system which effectively provides a doubling of capacity to 48 channels at the usual sampling and transmission rates by encoding the customer signal samples into words of four bits each. In this system the values of the four encoding bits are assigned in PCM-to-ADPCM transcoders or in ADPCM digital channel banks by complex algorithms which both predict and adapt to the voiceband signals based upon their magnitude, waveform, frequency content, and frequency spread. The operation of an ADPCM encoding system may be seen in the general description in U.S. Pat. No. 4,513,426.

The relatively limited permutations in the signals derived from human speech make possible the successful operation of ADPCM in that this system can readily predict from previously occurring signal samples the probable magnitude and frequency range of the ensuing signal pattern, and can adapt to the usually moderate variations in these parameters by optimally selecting the encoding bit assignments which will narrowly encompass the pattern range. In this manner an ADPCM system can reasonably reproduce the waveforms associated with speech by means of only four encoding bits.

During telecommunication conversations, listeners are reasonable tolerant of noise occurring during speaking intervals if the channel is quiet between the speech bursts, and therefore will not find objectionable the four-bit quantizing noise that is generated in the ADPCM encoding process.

The implementation of voiceband data transmission, on the other hand, particularly with high-speed (9.6 kb/s) modem equipment, has created a problem in that these transmissions normally span all but a small fraction of the voice bandwidth and outstrip the capability of the ADPCM system to predict and adapt to their effectively random, wide bandwidth signals. The encoding system is thus unable to sense a trend in the signal to which the adaptive algorithm may be applied, and, therefore, generates simple four-bit encoding of the wide-band signal. The resulting high level of quantizing noise renders the telephone channel incapable of faithfully functioning as a medium for high-speed modem use.

Due to the serious degradation in transmission quality imposed by ADPCM encoding upon systems operating with high-speed modems or with other broad bandwidth applications, standards bodies have imposed restrictions, including complete exclusion, on the number of such systems that may be permitted on an end-to-end connection. Unfortunately, however, since they are based upon the use of test signals which have easily-predictable waveforms, none of the ANSI/IEEE Std. 743-1984 standard voiceband test procedures are capable of identifying the presence of an ADPCM system in a transmission circuit.

Thus, the capabilities of ADPCM encoding systems which enable them to predict and adapt to common voiceband conversation signals allow them to remain largely transparent to identification by previously available, standardized test methods. As a result, such standard test procedures cannot distinguish between a lower signal quality resulting from a single ADPCM system and that resulting from a number of less deleterious PCM systems in tandem, and are ineffective as a means for determining the quality of ADPCM equipment or the contribution such equipment may make to overall noise in a system.

The present invention, on the other hand, provides a method of testing which avoids the predictive and adaptive capabilities of an ADPCM encoding system in order to allow the identification of the presence of such a system in a voiceband telecommunications circuit, and which additionally enables accurate testing of the quality of ADPCM encoding equipment with respect to the generation of spurious noise in a transmission.

SUMMARY OF THE INVENTION

The present invention provides test equipment and a method for its implementation which impose upon a telecommunication transmission system comprising ADPCM encoding equipment a multiple-tone test signal of near-white-noise waveform which encompasses substantially the entire width of the voiceband, thereby overloading the predictive and adaptive capabilities of the ADPCM system in much the same way as does an operative high-speed modem data transmission signal. Such signal is derived in the manner described in U.S. Pat. No. 4,301,536, and comprises twenty-one tones of narrow bandwidth, or high spectral purity, which extend in uniform frequency distribution across the voiceband between about 200 and 3400 Hz. Another useful test signal may comprise the centrally-disposed fifteen contiguous tones of such a twenty-one tone signal.

The test signal, after transmission through the communications system in which it suffers the perturbations of quantizing noise arising from the ADPCM encoding function, is input to a test circuit comprising an array processor, or spectrum analyzer, which separates the power in the signal into discrete frequency "bins" that include the frequencies of the original test signal tones. The total power in the twenty-one tone bins is measured as the indication of transmitted signal, and the total power in the remaining bins is measured and C-message weighted, according to the ANSI/IEEE standard, to obtain the measure of the noise transmitted with the test signal. These measurements are then used to directly calculate the signal-to-noise ratio (SNR) of the ADPCM system.

Since the bandwidth and phase distribution of the twenty-one tone test signal are such as to cause it to resemble a white-noise signal extending across the voiceband, the adaptation and prediction algorithms of the ADPCM system, which are essential to maintaining an acceptable SNR in the four-bit signal encoding of speech, are unable to be implemented and there results the generation by the system of the expected, larger, four-bit, linearly-encoded quantizing noise. Such quantizing noise is, in fact, so extreme that the resulting low SNR, in the approximate range of 23 dB as compared with 33-36 dB for multiple eight-bit encoding PCM systems in tandem, is a characteristic and reliable indicator of the presence of ADPCM equipment in the transmission system.

THE DRAWING

The present invention may be readily seen in the accompanying drawing of which:

DESCRIPTION OF THE INVENTION

Figure 1:
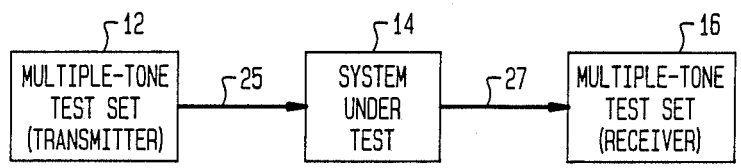
FIG. 1 is a simplified diagram representing an arrangement of components of a multiple-tone test set during testing of a target telecommunications system according to the present invention.

The multiple-tone test set transmitter and receiver sub-systems generally depicted at 12 and 16, respectively, in FIG. 1 may, in actual implementation, be resident in separate units, as shown, or in a single piece of equipment, depending upon the arrangement of the telecommunication system 14 targeted for test, and the accessibility of the transmitted signals at the test site. For simplicity, however, the following discussion presumes that a single test site is fully adequate for conducting a system test, and that the one unit to be employed will incorporate all of the signal generation and transmission components, and the signal sampling, collection, and processing components, in a configuration similar to that shown in the representative simplified diagram of FIG. 2.

The testing procedure of the present invention basically entails the generation, at 12, of the desired multiple-tone test signal, substantially in the manner described in U.S. Pat. No. 4,301,536; transmission of the signal through the target system 14 which may comprise a suspected ADPCM device; and collection and processing of the transmitted signal, at 16, to measure and compare the total of the power levels at the input multiple-tone frequencies with the total power at the remaining frequencies. The resulting signal-to-noise ratio may be utilized as a simple indicator of the presence of suspected ADPCM processing in the target system, or may be employed in the evaluation of the quality of an ADPCM encoder.

Figure 2:
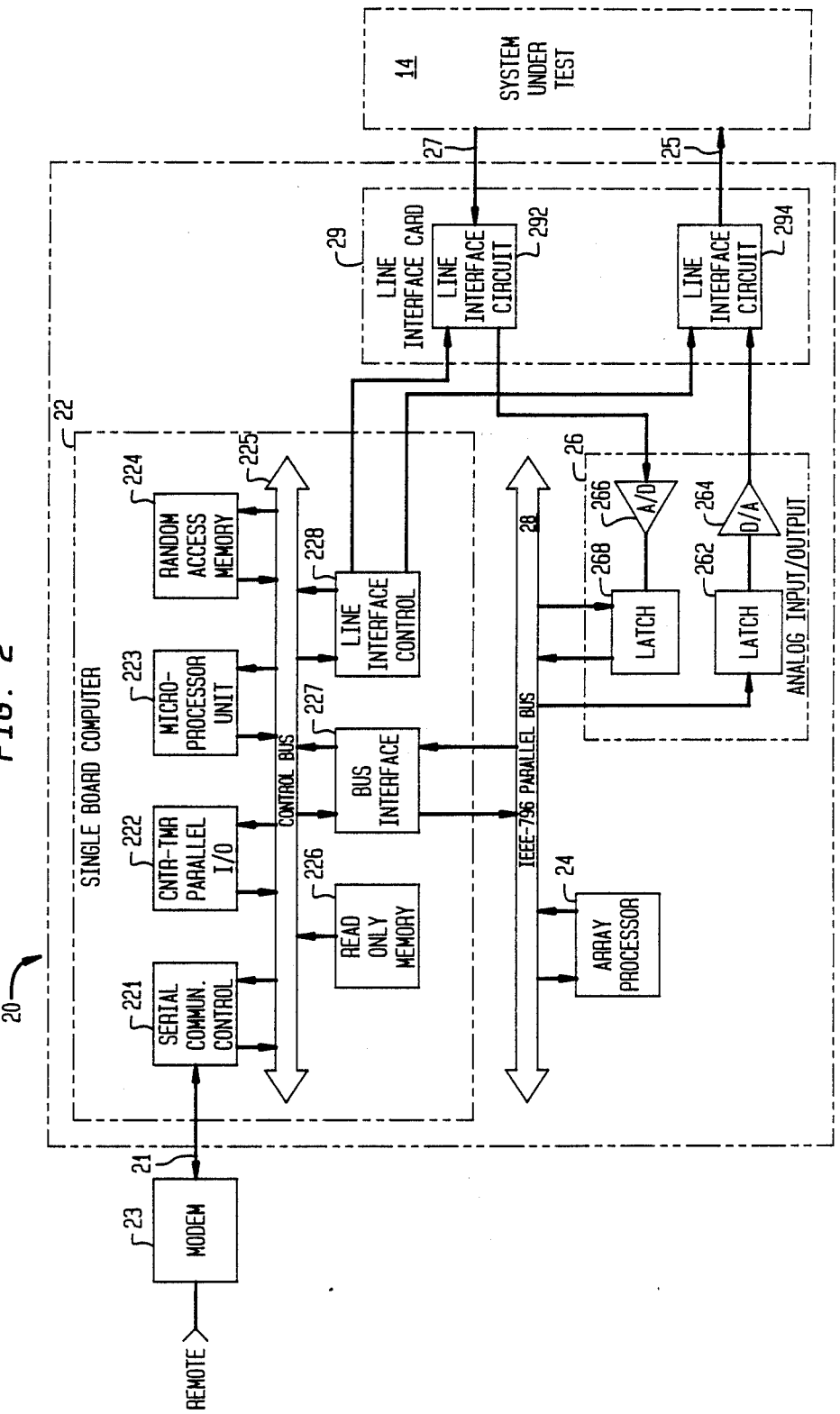
FIG. 2 is a simplified block diagram of a multiple-tone test set of FIG. 1.

A typical multiple-tone test set useful in the practice of the present testing procedure is shown diagrammatically at 20 in FIG. 2 and generally comprises a single board microcomputer 22, an array processor 24, and an analog input/output subsystem 26, all communicating through an IEEE-796 parallel bus 28. The test set further comprises a line interface card 29 which, in the usual manner, ensures proper communication between the balanced signals of lines 25, 27 and the unbalanced converters of analog I/O subsystem 26.

Of the numerous microcomputers currently available in the art, and which may be utilized in the construction of a test set for the present procedure, the single board unit employed in an embodiment of the invention was the Heurikon HK68 Microcomputer marketed by Heurikon Corporation of Madison, WI and described in their user's manual of June 1983 for that device. Array processor 24 used in this example to perform the fast Fourier transform (FFT) analysis of the signal power spectra and to assist the MPU of microcomputer 22 with an inverse FFT calculation of the frequencies of the desired 21 signal tones was the DSP-AP-4 device described in the 1983 (Rev. n/c) User's Manual of DSP Systems Corporation of Anaheim, CA.

The RTI-732 analog input/output board of Analog Devices Inc., Norwood, MA, as described in their September 1982 specifications and manual, was selected for use as 12-bit D/A, A/D conversion subsystem 26. Line interface card 29 comprised in its input and output corrective interface circuits 292, 294, in addition to the usual transformers and protective circuitry, 8-pole 4 kHz anti-aliasing filters of Frequency Devices Incorporated, Haverhill, MA.

In operation, test set 20 is under the control of an operator through communication line 21 which may be a direct data input link or, as depicted in FIG. 2, may comprise a dial-in link via a common modem 23 from a remote operator location. By means of this link, the operator may input, from a host computer, the program routines and make the various selections of parameters to be implemented by the test set in the signal generation and analysis procedures, may initiate communication between the test set and the target system, and may receive test result data for display or other processing at the remote site.

Operator communication with the elements of test unit microcomputer 22 is via serial communications controller 221 and control bus 225 which also serves as the communication link among the other microcomputer components. In the usual manner, read only memory (ROM) 226 contains program routines for initialization and restart conditions as well as file/data transfer programs for the downloading of process control programs from the remote host computer to random access memory (RAM) 224 of the local test unit computer 22. A more dedicated test set could, of course, incorporate such control programs, or various basic routines of such programs, in ROM 226 at the outset.

Microprocessor unit 223 assumes control of the test process and the interaction of others of the component elements of computer 20 after initial loading of RAM 224 with program routines and variable operator input, such as the number of tones to employed and averages to be made, and directs the generation and transmission of the desired test signal and the sampling and processing of the signal subsequent to the test transmission.

Figure 7:
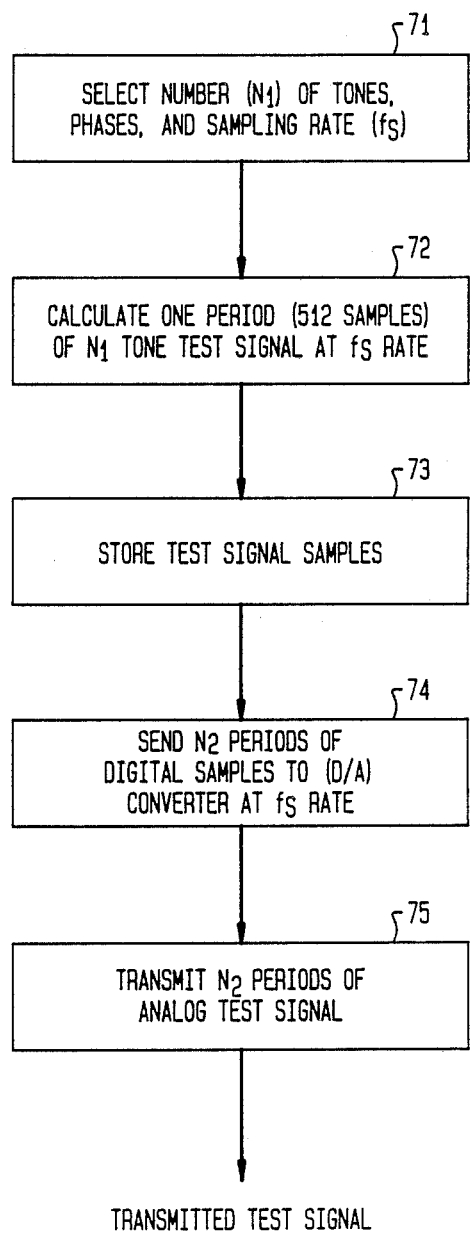
FIG. 7 is a flowchart of a process of generating a multiple-tone test signal for use in the implementation of the testing procedure of the present invention.
Figure 8:
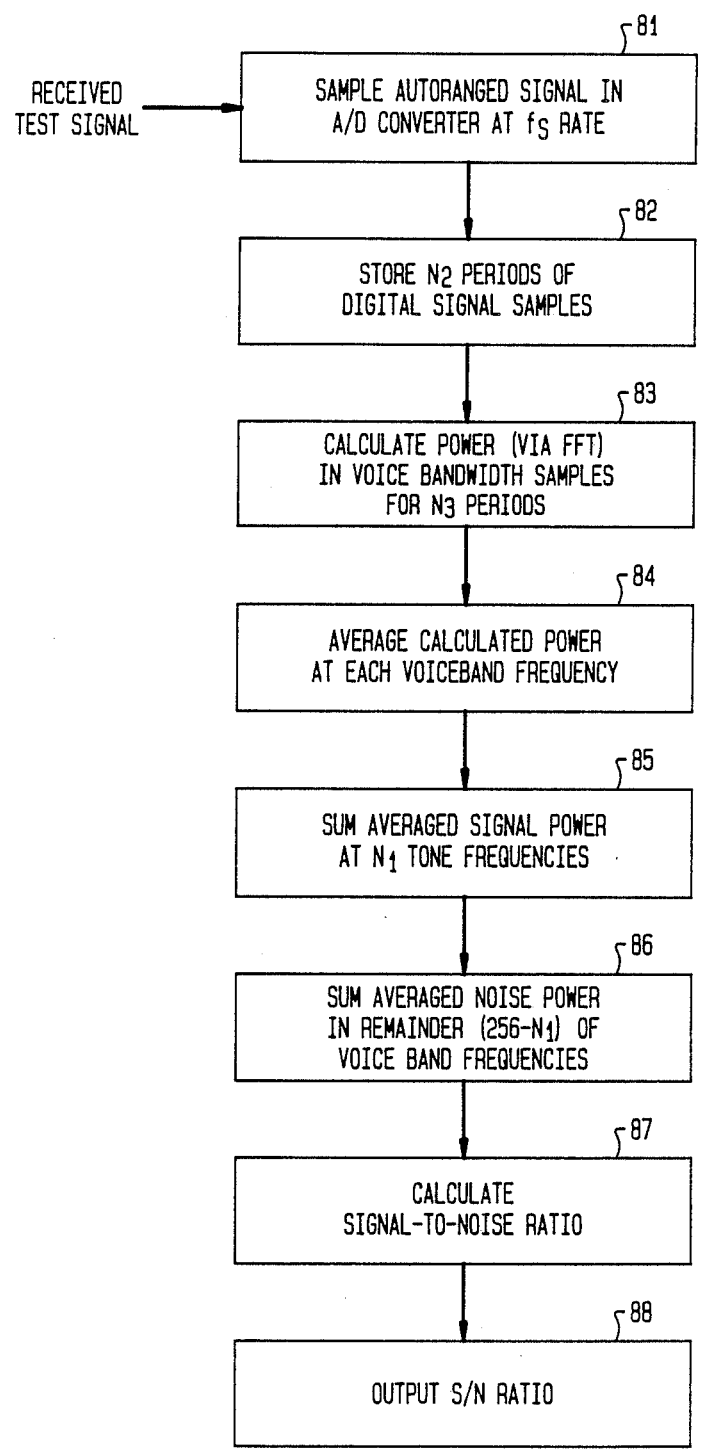
FIG. 8 is a flowchart of the processing of a multiple-tone signal in the testing procedure after such signal has been transmitted through a target system.

The process of the present invention is broadly diagrammed in FIGS. 7 and 8. The steps outlined in FIG.

7 are implemented directly by the process program or interactively by operator and program control to provide the multiple-tone test signal in substantially the same manner as that described to derive a test signal in U.S. Pat. No. 4,301,536, noted earlier. In the initial step 71, after the loading of the process program in ROM 224, the operator selects the desired number, $N_1$, of tones which are to comprise the test signal, and indicates also a phase relationship for each of the tones such that the composite signal will have a selected amplitude and a probability density function similar to that of high-speed data modems. A rate of sampling is likewise specified by the operator, in the present embodiment, and is selected at a level which will provide a sufficiently high data point density to define a useful test signal extending at least over the voice bandwidth.

The number, $N_1$, of tones that has been found to be particularly useful in the present testing process is the same twenty-one which has been described in the aforementioned U.S. Pat. No. 4,301,536, and which advantageously allows for the contemporaneous testing of envelope delay distortion (EDD) as disclosed in that specification. It has been determined from the instant development, however, that the individual frequencies which were recommended there are not generally satisfactory, since their derivation is based upon the same 8 kHz sampling rate as is used in the PCM encoding processes which will normally be influencing any telecommunication system targeted for test with the current procedure.

This proximity in sampling rates is particularly undesirable in view of the fact that the slight uncontrolled variations between these rates will lead to a very low frequency heterodyne instability in the signal received after transmission through the system under test, and result in the requirement for an inordinate number of averages over extended test periods in order to obtain consistent measurements. It is therefore preferable that the sampling frequency, which will of necessity be precisely the same for test signal generation as for received signal sampling, be selected so as to ensure a significant difference from the normal 8 kHz PCM sampling rate. As will later be seen, a sampling frequency of 8192 Hz proved to be effective and convenient in the instant process, although any number of frequencies that provide tone frequency spacings reasonably close to, i.e. within a few decimal places of, integers would serve equally well.

To take advantage of the current availability of reasonably priced array processors capable of providing signal analysis power spectra of 512 points, where a point has both a real and an imaginary value, 512 frequency "bins" were utilized in processor 24 of the present example. At the selected sampling rate of 8192 Hz, this resulted in a sample granularity, $\Delta f$, of 16 Hz in the analysis spectrum. This distribution factor was implemented in the following formula by computer MPU 223 through an inverse fast Fourier transform with array processor 24 to calculate, as at process step 72, the 512 12-bit samples for one full period of the test signal comprising the 21 tones of frequencies, f(t), equally spaced across the voice band:

$$f(t) = \sum_{n=1}^{21} \sin[2\pi\Delta f(10n + 3)t + \Theta_n]$$

The 10n factor in the formula ensures that the tone spacing is substantially the same as the sidebands in an ANSI/IEEE Std. 743-1984 EDD signal, while the additional displacement factor of 3 in the multiplier, (10n+3), will ensure, upon analysis sampling, that all the second order intermodulation distortion (IMD) products in the received test signal will fall in the nine bins between adjacent frequency bins of the 21-tone comb, and that all third order IMD products, except those with an odd number of minus signs, e.g. 2B−A or B+C−A, will likewise fall in the those intermediate bins.

The remaining phase displacement factor, $\theta_n$, provides a distribution of $N_1$ phase shifts across the selected number of tones. With the 21 tone signal, for example, these phases are the 21 possible multiples of 17.14 degrees, i.e. 360 deg./21, and are arbitrarily assigned to the individual tones in the manner suggested in U.S. Pat. No. 4,301,536. Any such phase assignment sequence may then be rotated to a particular orientation which will result in the peak-to-rms ratio and probability density function for the derived 21-tone test signal being similar to that for white noise and approximating that of a high speed voiceband data modem, the device which is significantly affected by ADPCM systems. For instance, a 10-position rotation would be useful with a CCITT V.32 9600 b/s modem. In the present example, the following assignment of phases, representing a 17-position rotation from the initial assignment, proved to be particularly desirable for use with a system utilizing a CCITT V.29 9600 b/s modem:

TABLE 1

Phase Assignments for 21 Tones

| Tone | Freq. | Phase | Tone | Freq. | Phase | Tone | Freq. | Phase |
|---|---|---|---|---|---|---|---|---|
| 1 | 208 | 325.71 | 8 | 1328 | 17.14 | 15 | 2448 | 154.26 |
| 2 | 368 | 240.00 | 9 | 1488 | 120.00 | 16 | 2608 | 68.57 |
| 3 | 528 | 257.14 | 10 | 1648 | 222.86 | 17 | 2768 | 0.0 |
| 4 | 688 | 102.86 | 11 | 1808 | 85.71 | 18 | 2928 | 274.29 |
| 5 | 848 | 137.14 | 12 | 1968 | 205.71 | 19 | 3088 | 342.86 |
| 6 | 1008 | 188.57 | 13 | 2128 | 308.57 | 20 | 3248 | 171.43 |
| 7 | 1168 | 51.43 | 14 | 2288 | 291.43 | 21 | 3408 | 34.29 |

Each of the 512 computed 12-bit samples comprising the 62.5 msec. (512/1892 Hz) period of the 21-tone test signal is stored, as at step 73, in RAM 224 for use during the test to generate the transmission signal in analog I/O component 26 of test set 20. As previously noted, the sampling rate, $(f_s)$, was selected to ensure a rapid stabilization of the measurement of the received signal by reducing any beat period to one which would be well within a reasonable term of test cycle.

Figure 3:
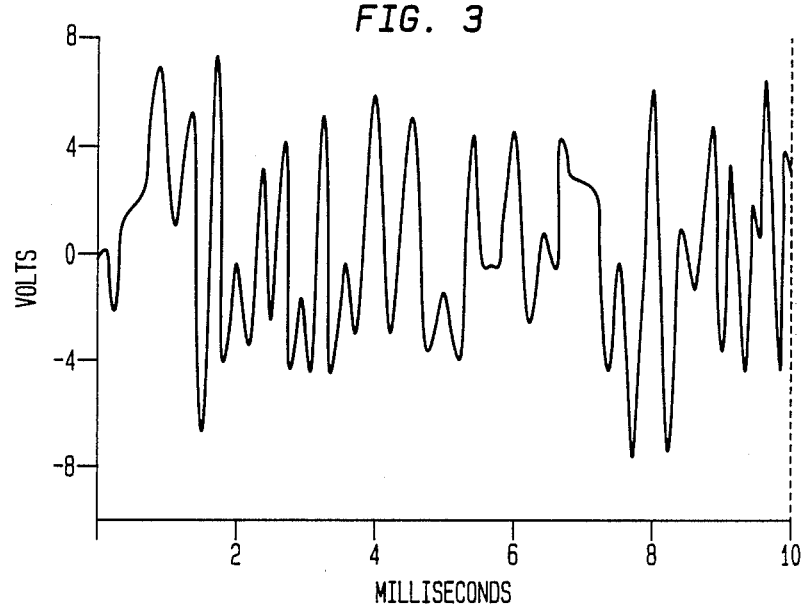
FIG. 3 is a plot of the first 10 milliseconds of the 64 millisecond period of a 21-tone signal utilized in the test procedure of the present invention.

The operator, or the control program, begins the actual test procedure, at step 74, by initiating the forwarding of the stored test signal from RAM 224 to latch 262 of analog I/O 26 where, under control of counter-/timer I/O 222, the digital samples of the signal are sequentially transmitted at the sampling rate of 8192 Hz through D/A converter 264 where the 21-tone analog test signal is constructed. As noted in the above table, the tones resulting from the foregoing parameters in this example were established at the convenient frequencies of 208, 368, 528, ..., 3248, and 3408 Hz. The first ten msec. segment of the 62.5 msec. period of this signal is depicted in the plot of FIG. 3.

In order to provide for the later acquisition of a plurality of signal test samples for averaging of results, the digital samples of the test signal period are buffer-cycled a selected number of times through converter 264 to generate the desired repetitions, $N_2$, of the basic analog signal period which are transmitted, at step 75, through the previously-noted protective line interface circuit 294 to system 14 under test over communication line 25. In the present example, with the 8192 Hz sampling rate and the particular constituency of the target system, it was observed that the output signal from an ADPCM was sufficiently settled within one 62.5 msec. period to ensure measurement accuracy; therefore, ten 62.5 msec. periods were selected to permit averaging of the middle eight periods. It will be apparent, of course, that this number may be varied as desired or as required by the circumstances of a particular test.

After transmission through target system 14 and perturbation by PCM and ADPCM encoders, and such other sources of noise which may be present in the system, the test signal is recovered by test set 20 over communication line 27 through protective line interface circuit component 292 of interface card 29. To accommodate loss of signal in system 14 and to ensure optimum operation of A/D converter 266, the signal is "autoranged", in the usual manner, to just below its overload point with levels of gain programmed by MPU 223 through interface control 228. The received signal may then be sampled in converter 266 without the danger of clipping error.

The measurement processing of the test signal received after transmission through system 14 is generally depicted in the flowchart of FIG. 8. As indicated at step 81, this segment of the test procedure is initiated by the sampling of the autoranged signal in A/D converter 266 of analog I/O 26 where digital samples are output by latch 268 under control of MPU 223 and counter/timer 222 at the original sampling rate, $f_s$, e.g. 8192 Hz in the present example.

Sampling of the signal is continued during the $N_2$ repetitions of the transmitted signal period and the resulting 512 digital samples of each period are stored, as at step 82, in RAM 224 for subsequent use in the analysis calculations. Such analysis of the power spectrum of the signal, in step 83, comprises the calculation by MPU 223, assisted by array processor 24, of the frequency domain signal power distribution by means of a fast Fourier transform (FFT) performed on the stored 12-bit digital samples of each signal period.

Figure 4:
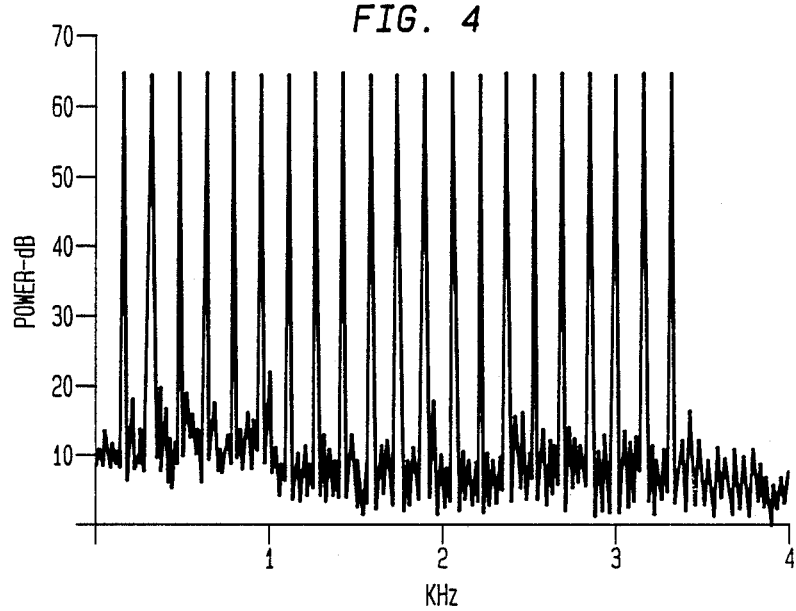
FIG. 4 is a plot of the power spectrum (power distribution versus frequency) of a 21-tone test signal prior to its transmission through a target system under test.

Since the bandwidth of interest in the current test example is that encompassing the voice band, i.e. between about 200 Hz and 3400 Hz, the FFT computation is performed on the stored data samples of a signal period to calculate the signal power at each of the 256 frequencies, or "frequency bins", regularly distributed at 16 Hz intervals from zero to 4096 Hz. In FIG. 4 there is depicted the plot of such a power spectrum resulting from a test arrangement in which the transmitter and receiver functions of the test set were connected back-to-back, i.e. where, in the general arrangement of FIG. 1, system 14 is removed. In this manner a noise base, or floor, arising from the operations of components of the test set may be determined for later use in any quantitative test measurements, as desired.

As previously noted, the number, $N_2$, of periods of the test signal that were transmitted and sampled upon return was selected in the present example to be ten on the basis of tests which determined the variance of a signal-to-noise ratio derived from computation over a single 62.5 msec. period. It was observed in the present example that the effects of such factors as line transients and ADPCM adaptation time were sufficiently settled within a fraction of one such transmitted signal period to ensure accurate measurement. Therefore, the FFT computations were begun on the third period samples and were repeated for the remaining $N_3$, or eight, periods to provide the basis for obtaining eight averages of the powers calculated, as at step 84, at each frequency bin and C-Message frequency weighted according to the ANSI/IEEE Std. 743-1984 standard. In practice, these eight-sample averages of the signal-to-noise ratio of ADPCM provided a standard deviation of 0.14 dB, and a 95% confidence that the mean is within 0.3 dB of the averaged value.

Utilizing the average values of the calculated power levels in the voiceband frequency bins, computations are made, as at steps 85, 86, summing the power in those $N_1$, or 21 in the present example, bins of the frequencies of the tones comprising the multiple-tone test signal, and summing the power in the remainder, $256-N_1$, of the voiceband bins. By further calculation, at step 87, of the ratio between the resulting sums of the power levels at the input signal tone frequencies and the power levels at the remaining "non-signal", or noise, frequencies there is readily obtained the signal-to-noise ratio in a signal affected by the perturbations arising in target system 14 from ADPCM encoding equipment or other sources. The result of the computation of S/N ratio is output at step 88, for example through modem 23 to the remote host control computer, where it may be utilized, along with similarly transmitted data obtained in the FFT analyses, in the evaluation of the ADPCM devices.

Figure 5:
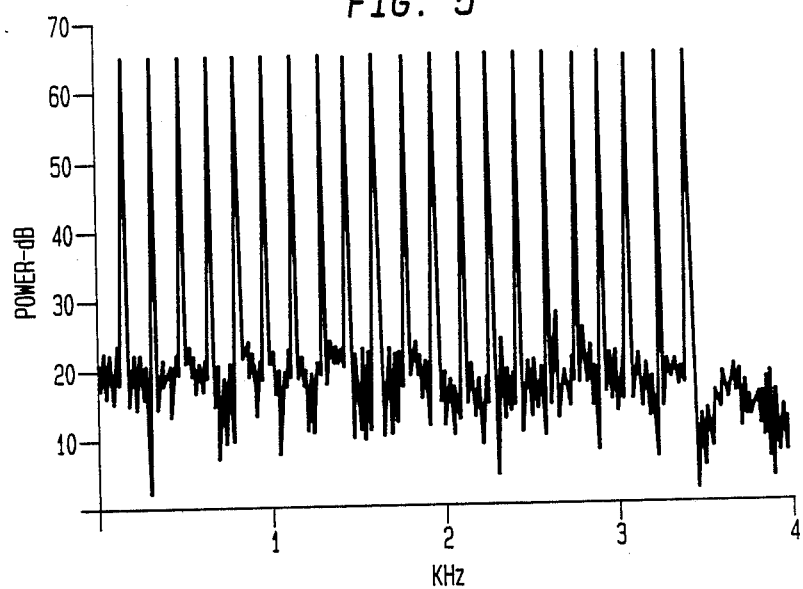
FIG. 5 is a plot of the power spectrum of the 21-tone test signal of FIG. 4 after transmission through a target system comprising a pair of PCM encoders in tandem.
Figure 6:
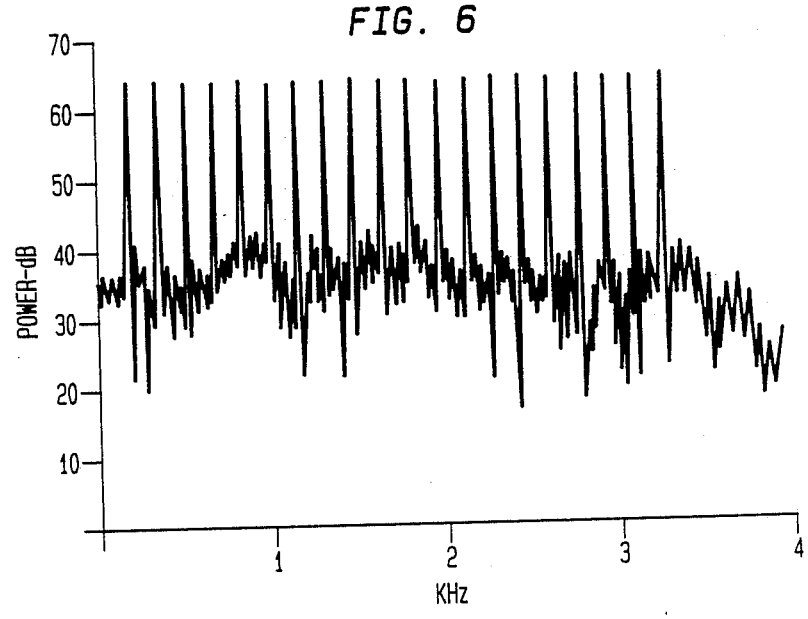
FIG. 6 is a plot of the power spectrum of the 21-tone test signal of FIG. 4 after transmission through a target system comprising a single ADPCM encoder.

In a series of tests conducted with the test set arrangement of the foregoing example, the back-to-back signal-to-noise (SNR), as depicted in FIG. 4, of the set averaged 48 dB. This baseline noise contributed less than about 0.6 dB to the average 39 dB SNR (FIG. 5) when a single pulse code modulation (PCM) device was inserted into the target system. The replacement of the PCM device with an ADPCM encoder, on the other hand, resulted in an average SNR (FIG. 6) of 23 dB, a level which clearly distinguishes the presence of the ADPCM.

The results of comparative testing in various PCM and ADPCM system configurations, as set out in the following table, confirmed that whereas the single-tone (1004 Hz) sinusoidal test signal prescribed by the ANSI/IEEE test method provides little significant difference in SNR among the equipment types, the 21-tone signal of the present method enables the detection of distinct loss levels indicative of one or more ADPCM encoders.

TABLE 2

| Test Signal | Signal-to-Noise Ratio Comparisons | | | | |
|---|---|---|---|---|---|
| | 1 PCM | 2 PCM | 1 ADPCM | 2 ADPCM | 4 PCM |
| Single-tone | 39 | 36 | 36 | 33 | 33 |
| 21-Tone | 39 | 36 | 23 | 20 | 33 |

From further testing with the procedure of the present invention it was determined that the repeatable accuracy is sufficient, i.e. to within about 0.3 dB, to dependably establish the presence of multiple ADPCM devices in tandem in a target system, and to readily compare the individual performance of a number of ADPCM encoders, particularly with respect to their ability to accommodate modems with a frequency spectrum similar to V.29 9600 b/s modems.

Other embodiments of the invention, such as might be achieved by reducing the number of tones in a test signal to exactly match the spectrum of a particular data modem, will be apparent from the foregoing description to those of ordinary skill in the art, and such embodiments are likewise to be considered within the scope of the invention as set out in the appended claims.

What is claimed is:

1. A method of testing the signal-to-noise ratio of a signal transmitted through a communication system which comprises:
   (a) introducing as input to said system a multiple-tone signal consisting essentially of a plurality of discrete tones of narrow frequency bandwidth;
   (b) sampling at a regular rate the amplitude of the system output signal comprising said multiple-tone signal after transmission through said system;
   (c) computing from the resulting samples the power levels of said output signal in a multiplicity of contiguous narrow frequency bandwidths including said plurality of input tone bandwidths;
   (d) recording the individual signal power levels in each respective one of said multiplicity of bandwidths;
   (e) summing the recorded power levels in the plurality of bandwidths corresponding to said input multiple-tone signal bandwidths, thereby obtaining a measure of the multiple-tone signal output from said system;
   (f) summing the recorded power levels in the others of said multiplicity of bandwidths not included in said plurality of input tone bandwidths, thereby obtaining a measure of noise output with said multiple-tone signal output; and
   (g) calculating from said measures of multiple-tone signal and noise outputs the signal-to-noise ratio of said system output signal.

2. The method according to claim 1 wherein said output signal sampling rate is significantly different from the sampling rate of pulse code modulation encoder means comprising said communication system.

3. The method according to claim 1 wherein each of the plurality of discrete tones in said input signal is phase-displaced from the discrete tones of adjacent frequencies according to a sequence established by assigning to each of said plurality a different arbitrary multiple of a regular phase spacing among said plurality of tones.

4. The method according to claim 3 wherein said phase assignment sequence is rotated amoung said tones to an orientation at which the peak-to-rms ratio for said multiple-tone signal is similar to that of white noise.

5. The method according to claim 1 wherein:
   (a) said multiple-tone input signal is introduced during a discrete time period; and
   (b) said output signal sampling is accomplished during receipt of said input signal at the sampling site.

6. A method of testing the signal-to-noise ratio of a signal transmitted through a system including adaptive differential pulse code modulation (ADPCM) encoding means which comprises:
   (a) introducing as input to said system a multiple-tone signal spanning the voice bandwidth and consisting essentially of a plurality of discrete tones of narrow frequency bandwidth;
   (b) sampling at a regular rate the amplitude of the system output signal comprising said multiple-tone signal after transmission through said system;
   (c) computing in power spectrum analyzer means the power levels of said output signal in a multiplicity of contiguous narrow frequency bandwidths including said plurality of input tone bandwidths;
   (d) recording the individual signal power levels in each respective one of said multiplicity of bandwidths;
   (e) summing the recorded power levels in the plurality of bandwidths corresponding to said input multiple-tone signal bandwidths, thereby obtaining a measure of the multiple-tone signal output from said system;
   (f) summing the recorded power levels in the others of said multiplicity of bandwidths not included in said plurality of input tone bandwidths, thereby obtaining a measure of noise output with said multiple-tone signal; and
   (g) calculating from said measures of multiple-tone signal and noise outputs the signal-to-noise ratio of the signal output from said system.

7. The method according to claim 6 wherein said output signal sampling rate is significantly different from said ADPCM encoding means sampling rate.

8. The method according to claim 6 wherein each of the plurality of discrete tones in said input signal is phase-displaced from the discrete tones of adjacent frequencies according to a sequence established by assigning to each of said plurality a different arbitrary multiple of a regular phase spacing among said plurality of tones.

9. The method according to claim 8 wherein said phase assignment sequence is rotated among said tones to an orientation at which the peak-to-rms ratio and probability density function for said multiple-tone signal approximates that of a high speed voiceband data modem.

10. Apparatus for testing the frequency response of a communication system, said apparatus comprising;
   (a) means for computing a multiplicity of first digital values representative of regular samples of the amplitude of an analog test signal consisting of a composite of a plurality of signals the respective frequencies of which are regularly distributed across the voiceband;
   (b) means communicating with said computing means for storing said first digital values;
   (c) first conversion means for converting the stored first digital values to said analog test signal amplitude samples;
   (d) means for transmitting said first digital values at a predetermined rate from said storage means to said first conversion means;
   (e) means for directing said analog test signal amplitude samples to input said communication system;
   (f) means for sampling at said predetermined rate the amplitude of the analog signal output from said communication system;
   (g) second conversion means for converting said analog output signal samples to representative second digital values;
   (h) means for directing said output signal samples to said second conversion means;
   (i) means for storing said second digital values;
   (j) array processor means for computing from said second digital values the power levels of said output signal in a multiplicity of contiguous narrow frequency bandwidths including said plurality of test signal frequencies;
   (k) means for directing said second digital values to said array processor means; and (l) means for recording individually said output signal power levels.

11. Apparatus according to claim 10 for testing the signal-to-noise ratio of a signal transmitted through a communication system which further comprises:
(a) means for summing the recorded power levels in said plurality of test signal frequency bandwidths to obtain a measure of the test signal output;
(b) means for summing the recorded power levels in the others of said multiplicity of bandwidths not included in said plurality of test signal frequency bandwidths to obtain a measure of noise output with said test signal output; and
(c) means for calculating from said measures of test signal and noise outputs the signal-to-noise ratio of the signal output from said system.

* * * * *

UNITED STATES PATENT AND TRADEMARK OFFICE
CERTIFICATE OF CORRECTION

PATENT NO. : 4,768,203

DATED : August 30, 1988

INVENTOR(S) : James F. Ingle

It is certified that error appears in the above-identified patent and that said Letters Patent is hereby corrected as shown below:

Column 3, line 36, "tone signal" should read --tone test signal--.

Column 9, line 48, "amoung" should read --among--.

Signed and Sealed this

Fourth Day of July, 1989

Attest:

DONALD J. QUIGG

*Attesting Officer*   *Commissioner of Patents and Trademarks*